United States Patent Office 3,084,191
Patented Apr. 2, 1963

3,084,191
N-SUBSTITUTED ACRYLAMIDE
James Regis Stephens, Stamford, Conn., assignor to American Cyanamid Company, New York, N.Y., a corporation of Maine
No Drawing. Filed Aug. 26, 1957, Ser. No. 680,395
3 Claims. (Cl. 260—561)

This invention relates to N-substituted acrylamides. More particularly, it relates to N-alkali metal acrylamides.

The new compounds of this invention have various uses. Particularly, however, they are useful as intermediates in the preparation of a wide variety of N-substituted acrylamides. For instance, they may be employed in the preparation of N-alkyl acrylamides, uses for which are well known by those skilled in the art.

The compounds of this invention may be prepared by different procedures. For instance, potassium acrylamide may be readily prepared by reacting acrylamide with a potassium alkoxide. This reaction is conducted at room temperature by bringing together acrylamide and the appropriate alkoxide in a reaction medium comprising the corresponding alcohol. On complete dissolution of the acrylamide, the temperature is reduced and precipitation initiated as by the addition of diethyl ether. The precipitated product may then be separated as by filtration or other suitable means. Sodium acrylamide, on the other hand, is more readily prepared by reacting acrylamide with sodium amide in ammonia. After agitating for a period of time, the reaction mixture may be filtered to recover sodium acrylamide.

EXAMPLE 1

N-Potassium Acrylamide

A solution of 8.6 parts (0.121 mol) of acrylamide in 150 parts of t-butanol is mixed at room temperature with 13.6 parts of potassium-t-butoxide in 100 parts of t-butanol. After standing for 5 minutes, the solution is diluted with 800 parts of diethyl ether until precipitation of fine needles commences, and then refrigerated for 2 hours during which copious precipitation takes place. The mixture is then filtered taking care to keep the product out of contact with moist air. The product melted with decomposition over a range of 140–295° C. It is characterized by acid titration and iodine number. Acid titration calc. 1.483 meq. HCl; found 1.465 meq. HCl. Iodine number calc. 232; found 200.

The product is further characterized by conversion to the N-ethyl derivative as illustrated in Example 3.

EXAMPLE 2

N-Sodium Acrylamide

A slurry of sodium amide is prepared by adding 12.5 parts (0.54 mol) of sodium in small portions to 300 parts of liquid ammonia containing 0.5 part of ferric nitrate as a catalyst. To this slurry is added 46 parts (0.65 mol) of acrylamide and the mixture agitated for several hours at the boiling point of ammonia. The mixture is then permitted to stand overnight at a Dry-Ice-acetone bath temperature after which it is again stirred for 4 hours at the boiling point of ammonia. Supernatant ammonia is then filtered off to give essentially a quantitative yield of N-sodium acrylamide. The product decomposes at ca. 250° C. It is characterized by acid titration and iodine number. Acid titration calc. 1.483 meq. HCl; found 1.465 meq. HCl. Iodine number calc. 273; found 270.

The following example further characterizes the product of Example 1 and demonstrates utility.

EXAMPLE 3

5.7 parts (0.08 mol) of acrylamide is added to a solution of 0.080 mol of potassium-t-butoxide in 60 parts of t-butanol. The acrylamide readily dissolves and on standing N-potassium acrylamide precipitates. 80 parts of ethyl bromide is then added and the mixture stirred and allowed to exotherm freely. After reaction is complete, potassium bromide is separated and the solution fractionated to give 3.6 parts of N-ethylacrylamide; B.P. 71–73° C. at 0.8 mm.; $n_{25}^D = 1.4698$; iodine number: calc. 256; found 251.

I claim:
1. N-alkali metal acrylamide.
2. N-potassium acrylamide.
3. N-sodium acrylamide.

References Cited in the file of this patent

UNITED STATES PATENTS 2,090,596    Jacobson _____ Aug. 17, 1937
2,749,331    Breslow _____ June 5, 1956